US007865286B1

(12) United States Patent
Hall

(10) Patent No.: US 7,865,286 B1
(45) Date of Patent: Jan. 4, 2011

(54) LIFT TRUCK SAFETY SYSTEM

(76) Inventor: Walter D. Hall, 22 Camber Pine Pl., Spring, TX (US) 77382

( * ) Notice: Subject to any disclaimer, the term of this patent is extended or adjusted under 35 U.S.C. 154(b) by 0 days.

(21) Appl. No.: 12/799,721

(22) Filed: May 1, 2010

(51) Int. Cl.
*B66F 9/20* (2006.01)
*G06F 19/00* (2006.01)

(52) U.S. Cl. ............................ 701/50; 701/33; 414/462

(58) Field of Classification Search ..................... 701/1, 701/50, 28, 33, 36; 477/462, 664, 635; 187/243, 187/224; 180/65.3
See application file for complete search history.

(56) References Cited

U.S. PATENT DOCUMENTS 3,167,201 A * 1/1965 Quayle ....................... 414/664
3,458,069 A 7/1969 Wickberg
3,485,391 A 12/1969 Johns
3,666,052 A 5/1972 Anderson et al.
3,825,139 A 7/1974 Geis
3,941,213 A * 3/1976 Stammen .................... 187/223
4,240,526 A 12/1980 Sanders
4,395,190 A 7/1983 Barchard
4,402,644 A 9/1983 Barchard
4,422,819 A 12/1983 Guest
4,497,606 A 2/1985 Hobson
4,498,838 A 2/1985 Johannson
4,598,797 A * 7/1986 Schultz ....................... 187/223
5,011,363 A 4/1991 Conley et al.
5,174,415 A 12/1992 Neagle et al.
5,411,361 A * 5/1995 Neri et al. .................. 414/664
5,482,141 A 1/1996 Wilson
5,748,097 A 5/1998 Collins
5,749,696 A 5/1998 Johnson
6,089,354 A 7/2000 Hettegger
6,296,081 B1 10/2001 Nagai
RE039,477 E 1/2007 Plate
7,568,547 B2 8/2009 Yamada et al.
2005/0186057 A1 8/2005 Reicks
2007/0084450 A1 4/2007 Oka et al.
2008/0011554 A1 1/2008 Broesel et al.

FOREIGN PATENT DOCUMENTS

WO WO 2006135137 12/2006

OTHER PUBLICATIONS

Hubtex, Hubtex 4120 Series Catalog, Oct. 2005, US.

* cited by examiner

*Primary Examiner*—Tan Q Nguyen
(74) *Attorney, Agent, or Firm*—The Matthews Firm

(57) ABSTRACT

A method of operating a lift truck, the method including the steps of actuating an override to move the lift truck from a safety configuration into a working configuration, positioning a load onto a front end assembly movably attached to the lift truck, disengaging the override, whereby the lift truck may automatically move into the safety configuration once the load is removed from the front end assembly.

20 Claims, 12 Drawing Sheets

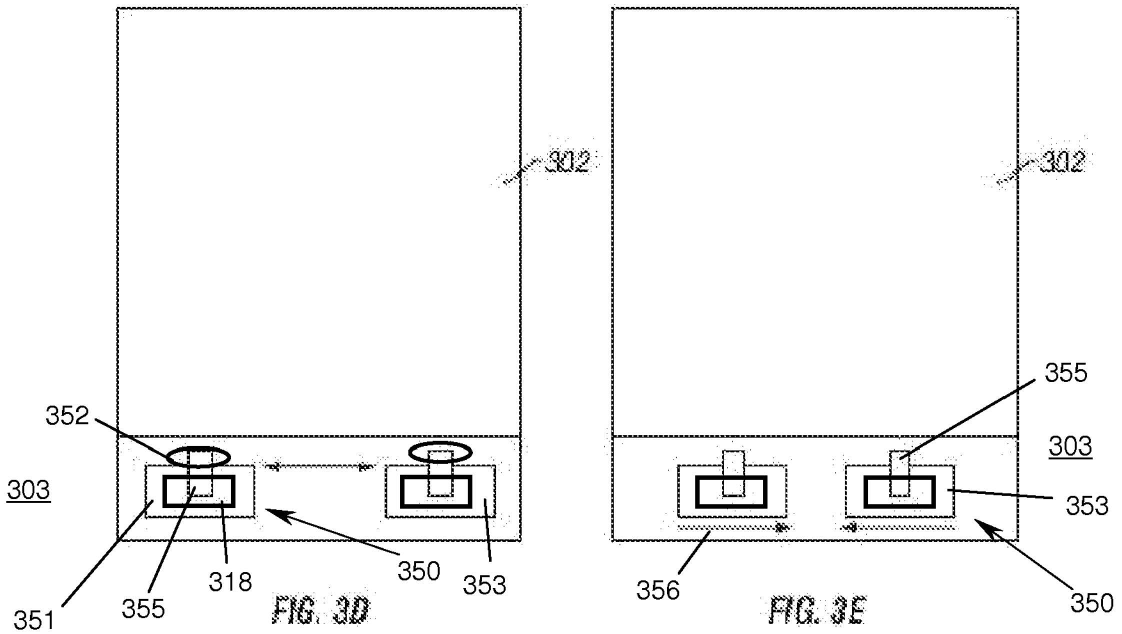
FIG. 3D
FIG. 3E
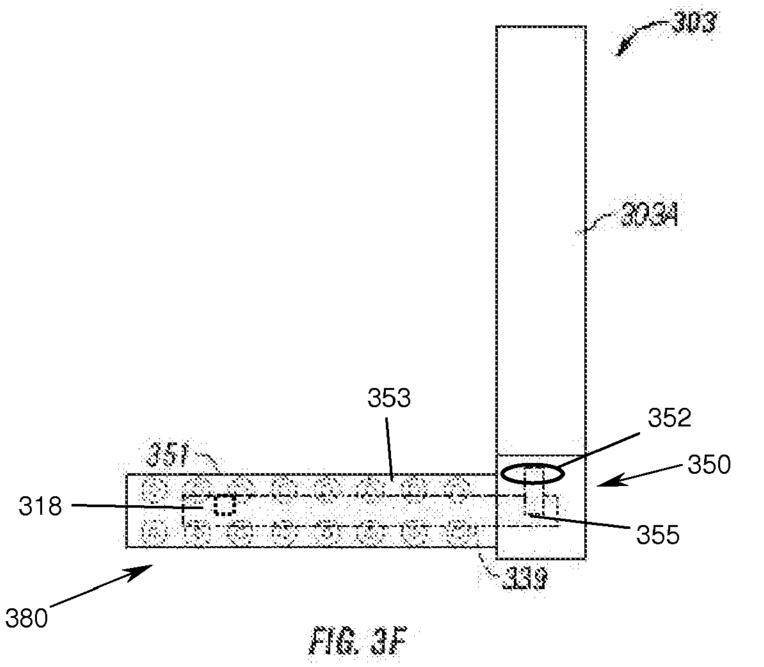
FIG. 3F

LIFT TRUCK SAFETY SYSTEM

BACKGROUND OF DISCLOSURE

1. Field of the Disclosure

The present disclosure relates in general to lift trucks, forklifts, front-end loaders, pallet jacks, and the like, that use a movable assembly to maneuver a load. Embodiments disclosed herein generally relate to a fail-safe system whereby a load-bearing portion of a lift truck is placed in a safe position, and/or the lift truck is inoperable when a load is not present on the load-bearing portion. Other embodiments pertain to a safety system that defaults a configuration of a lift truck to a safety configuration.

2. Background Art

It has long been known to employ a lift truck (e.g., a forklift), for the movement of loads and other objects found in industrial locations, warehouse settings, and other various applications. Although lift trucks are available in a multitude of sizes, types, and configurations, nearly all are characterized by a movable assembly and/or "mast" upon which an attached fork or other load-bearing member is supported. Elevational movement of the assembly is often achieved by controlled operation of an hydraulic ram and/or a piston-cylinder mechanism. Thus, typical use of a lift truck not only includes movement of loads between various locations, but various heights as well.

Referring to FIG. 1, a perspective view of a conventional lift truck 100 is shown. The lift truck 100 includes a frame or body 136 connected with a motorized mover 102, and there is an operator's workspace 152 that may include features such as a seat and steering wheel. A plurality of rails or guides 138 are usually connected to the frame 136 and/or motorized mover 102, with a corresponding front-end assembly 103 movably connected to the rails 138 in such a way that the front-end assembly 103 may move up, down, sideways, etc.

The front-end assembly 103 may include a mast **103*a*, as well as a lifter element 118. The lifter element 118 may take a number of configurations, but typically includes L-shaped forks 139 (i.e., tines, etc.) that are coupled to the mast 103*a*. The fork usually has a vertical portion 112 that abuts and/or is attached to the mast 103*a*. The fork 139 also includes a forwardly extending, generally horizontal leg 113 that constitutes the load-bearing portion of a lifter element 118. Together the forwardly extending forks 139 are used to lift load(s) 140 vertically relative to the motorized mover 102**.

A typical lift truck 100 has at least one ram cylinder-piston mechanism 146 for lifting and lowering a fork and/or the mast assembly, such that movement of the front-end assembly may be controlled by the ram cylinder-piston mechanism 146. As is known in the art, the lift truck has a working configuration 105, whereby the forks 139 may be inserted within a pallet 144 which supports the load 140 and/or 144, and the forks 139 may thereafter be lifted to raise the pallet 144 and load 140 for movement. Hence, as the mast **103*a* moves, so may the load 140 disposed on the lifting element 118. The front-end assembly 103 may move, for example, up or down with respect to the motorized mover 102**.

However, the use of the lift truck may be problematic and inherently dangerous. For example, whether stationary or in transit, fork(s) or other lifter members extend awkwardly outward into open space. This is extremely dangerous and has resulted in serious injury and death as a result of impact with operators, other workers, passersby, etc. The danger of the forks is exacerbated by the fact that the forks can be elevated. The extended forks also require a wide turn radius in order to not inadvertently run into people and objects. The need for improved safety in lift truck operation(s) is exemplified by the following description.

Even more problematic is that an operator has to focus on the task of operating and driving the lift truck (with or without load) often forgetting about, or losing track of, the elevation of the forks, such that the forks impact people or other items. Lift trucks are an essential part of most industrial and supply chains around the world. However, statistics indicate that lift trucks also present significant hazards to people occupying the same workspace, and lift truck induced injuries may be severe or fatal. While lift trucks are a major cause of industrial deaths and accidents, little has changed in lift truck operations to reduce the rate of incidents that occur as a result of lift truck usage.

As presented by a National Institute for Occupational Safety and Health (NIOSH) report, lift trucks strike people everyday, resulting in 100 deaths and over 20,000 injuries annually in the United States Alone. The NIOSH report shows that approximately every 3 days, someone in the US is killed in a lift truck related accident. Each year, an additional 94,750 injuries related to forklift accidents are reported. Besides workman's compensation and/or lost time at the job, there are huge lawsuits awarded for lift truck accidents. The costs incurred as a result of lift truck accidents are estimated to be in excess of $100 million dollars US annually.

Additionally, lift trucks cause damage to material. Recent events include the shut down of a busy North Carolina port after a lift truck operator accidentally punctured containers of pentaerythritol tetranitrate (PETN), the same chemical used in a Christmas Day airline bombing attempt. Not only is there an expenditure of a massive amount of resources to clean up spilled materials, but accidents such as these cause concern about acts of domestic terrorism. This leads to additional expenditure of resources, like involvement by the Department of Homeland Security, increased security at airports, etc., each of which having an unrelenting domino effect on an entire portion of the national economy.

The use of conventional lift trucks is problematic, and as a consequence, the use of lift trucks, especially in small or tight spaces, is difficult, inconvenient, and dangerous. As such, there has long been a chronic need in the use of lift trucks (or other comparable material handling equipment) for a safety system that can be used to reduce or eliminate the risk of serious injury and death to people. There is a need for a safety system that may be employed rapidly and dependably, and even automatically, that includes moving the front-end assembly to an out-of-the-way position. These needs are prevalent on new and existing lift trucks, such that there is a need to retrofit existing lift trucks with a safety system.

There are additional needs for a lift truck capable of a smaller turning radius that results from the forks/blades being retracted/stored/moved to an out-of-the-way position. There is also a need for a lift truck that has a considerably smaller "footprint" during storage and non-load bearing travel. There is a chronic need for the prevention of injuries and loss of life associated with load and non-load bearing travel. There is a comparable need for the prevention of loss of material and property damage associated with non-load bearing travel.

SUMMARY OF DISCLOSURE

In one aspect, embodiments disclosed herein relate to a method of operating a lift vehicle that includes actuating an override to move the lift vehicle from a safety configuration into a working configuration; positioning a load onto a front end assembly movably attached to the lift vehicle; and automatically moving the lift vehicle into the safety configuration once the load is removed from the front end assembly.

In other aspects, embodiments disclosed herein relate to a forklift safety system that includes a motorized mover; a front end assembly movably attached to the motorized mover, wherein the front end assembly is movable between at least one of a safety configuration and a working configuration; and a load sensor operatively connected between the motorized mover and the front end assembly, wherein the load sensor is configured to detect the presence of a load on the front end assembly, wherein the front end assembly automatically moves to the safety configuration when the load is not detected by the load sensor.

In yet further aspects, embodiments of the present disclosure also relate to a front end assembly for a motorized mover that includes at least one lifter element movably attached to the motorized mover; and at least one load sensor operatively connected to the at least one lifter element, wherein the front end assembly is configured to move between at least one of a safety configuration and a working configuration in response to a signal detected by the at least one load sensor, wherein the signal pertains to the presence of a load on the at least one lifter element.

Other aspects and advantages of the disclosure will be apparent from the following description and the appended claims.

BRIEF DESCRIPTION OF DRAWINGS

FIGS. 3A, 3B, 3C, 3D, 3E, 3F, 3G, 3H, 3J, and 3K show multiple perspective views of several lift trucks comparable to each other positioned in various safety configurations, in accordance with embodiments of the present disclosure.

DETAILED DESCRIPTION

Figure 1:
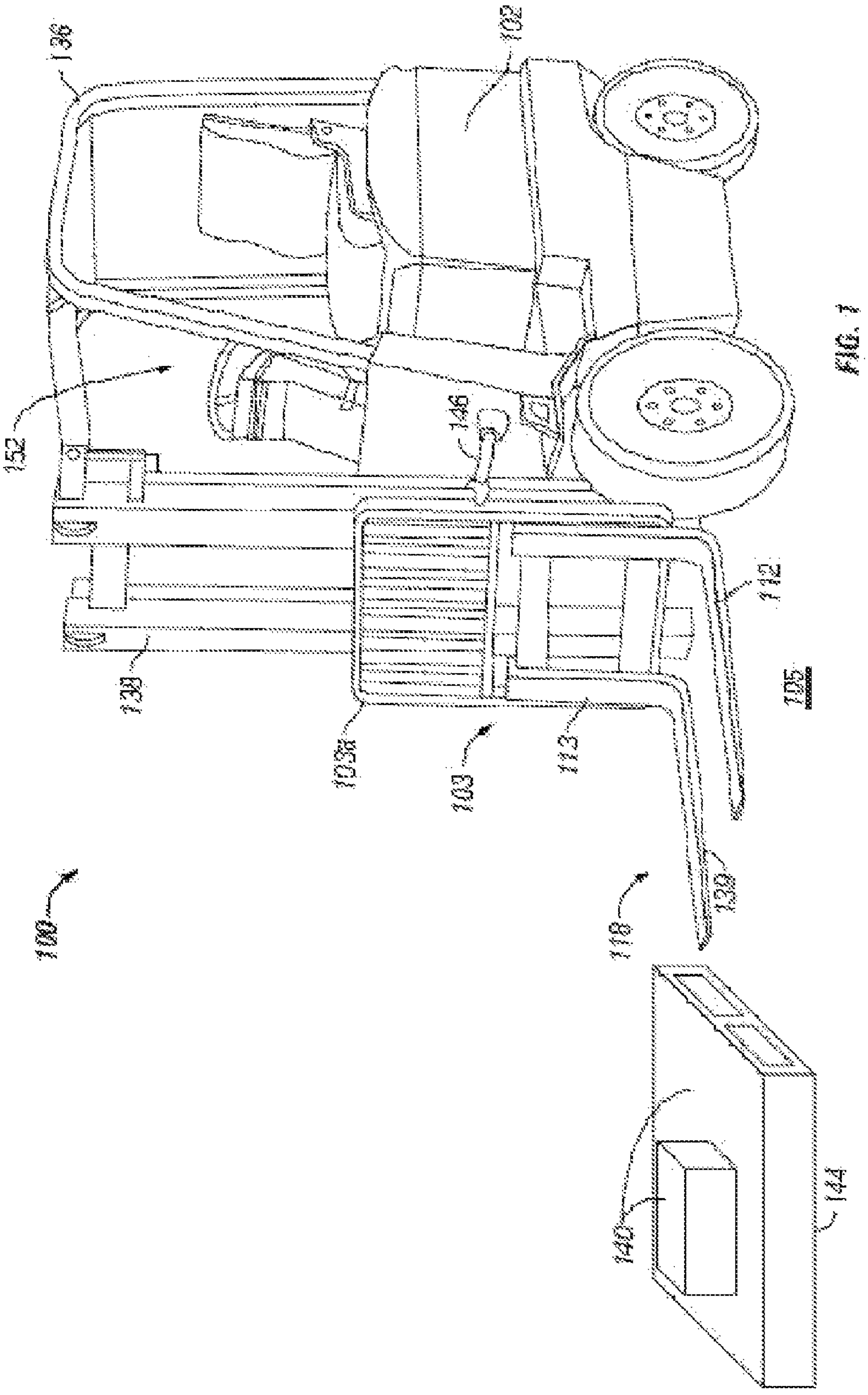
FIG. 1 shows a perspective view of a conventional lift truck.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

Figure 2A:
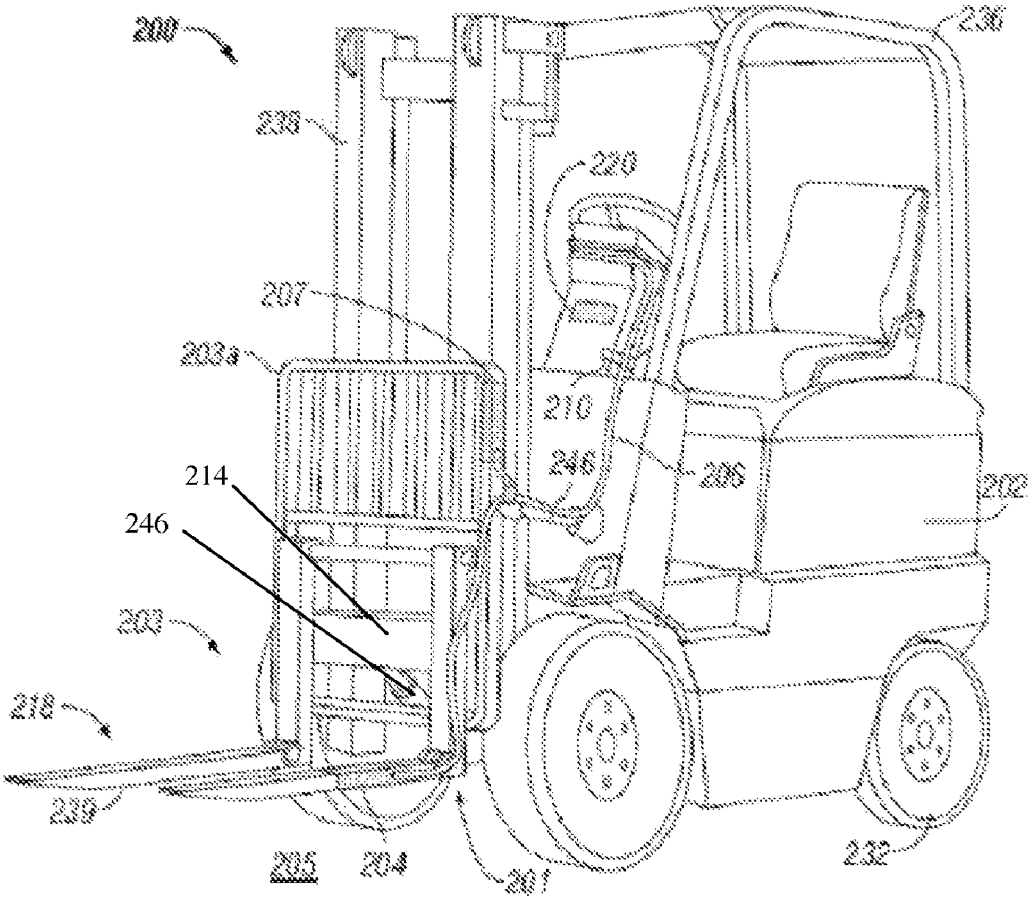
FIGS. 2A and 2B show a perspective view of a lift truck in a working configuration, and a corresponding operator workspace, in accordance with embodiments of the present disclosure.
Figure 2B:
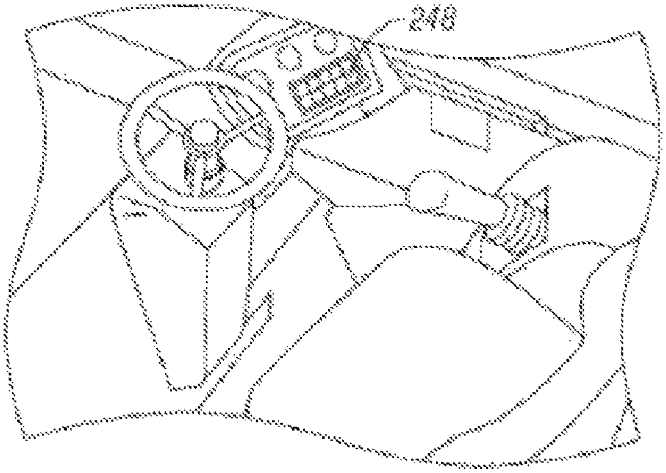

Referring now to FIGS. 2A and 2B, a perspective view of a lift truck 200 in a working configuration according to embodiments of the present disclosure, is shown. The lift truck 200, which may resemble the previously described lift truck 100, may include standard features, such as a motorized mover 202 with one or more wheels 232 operatively attached thereto. Instead of wheels 232, lift truck may have tracks, rollers, etc.

Although the mover 202 may use a combustion engine (not shown) to provide mechanical motion of the mover 202, the engine does not have to require gasoline. For example, the engine may run on natural gas or propane. Alternatively, the motorized mover 202 may also use a pneumatic or hydraulic motor; however, the type of motor and motorized motion is not meant to be limited for the embodiments of the disclosure described herein. For example, the lift truck 200 may include other movers, such as an electrically powered mover.

FIGS. 2A and 2B together show a safety system 201 of the present disclosure may include one or more of the following operatively connected to the lift truck 200. There may be various sensors, such as a load sensor 204 and a position sensor 207, as well as an interactive display panel 248. Any of the sensors of the present disclosure may include a number of well known sensor types, such as a tape reel, a Murphy-type switch, a rotary encoder, or Hall-effect transistors, the description and operation of which are all known to one of skill in the art.

The safety system 201 may include appropriate electrical wiring and/or other operatively connectable (e.g., hydraulic pressurized lines) devices 206 to provide the system 201 with power and/or other utilities as may be needed. The interactive display panel 248 may allow an operator to interact (i.e., interface, etc.) with systems (automated or otherwise) of the present disclosure. For example, the operator may touch the panel 248 to actuate a cylinder-piston mechanism 246, which in turn may lift the front-end assembly 203 to a desired position.

As another example, the operator may touch the panel 248 to actuate an override device 210. Actuation of the override device 210 may, for example, allow the lift truck 200 to operate even though the lift truck 200 may be moved into a safety configuration (e.g., 308, FIG. 3A). There may be corresponding indicators on the panel 248 to indicate various statuses of the lift truck 200, such as the presence of a load (not shown), the position of the front-end assembly 203, and/or the configuration of the lift truck 200. The override 210 may include, but is not meant to be limited by, a switch, a key, a lever, etc., or any other kind of device known to one of ordinary skill in the art used to provide override capability.

The override 210 may be enabled and/or disabled, as may be necessary. For example, once the override 210 is enabled, the lift truck 200 may be moved to the working configuration 205. Once in the working configuration 205 and a load is detected (not shown), the override 210 may be disabled, such that when the load is removed and/or no longer detected, the safety system 201 may automatically move the front end assembly 203 to a safety configuration (not shown here).

The sensors 204, 207 and display panel 284 may be in operative communication with a controller (not shown), which may include a CPU, a processor, a memory, etc., the operation of which is known to one of skill in the art. The controller may be used to control any of the lift truck 200 operations, such as operating, moving, driving, lifting, etc.

Referring now to FIGS. 3A, 3B, 3C, 3D, 3E, 3F, 3G, 3J, and 3K, multiple perspective views of a lift truck 300 in various safety configurations according to embodiments of the present disclosure, are shown. The lift truck 300, which may resemble the aforementioned lift truck 200, may include a motorized mover 302 with one or more wheels 332 attached thereto.

Figure 3A:
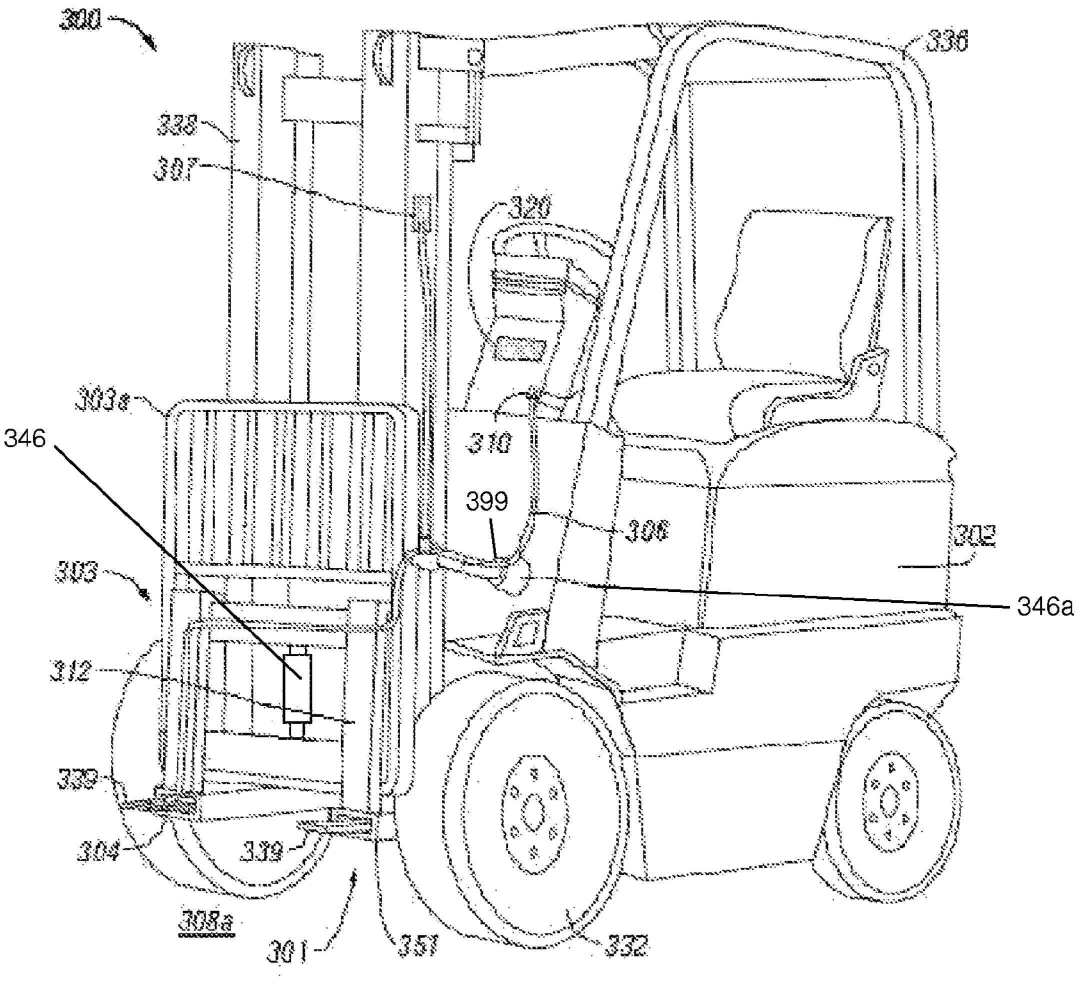
Figure 3B:
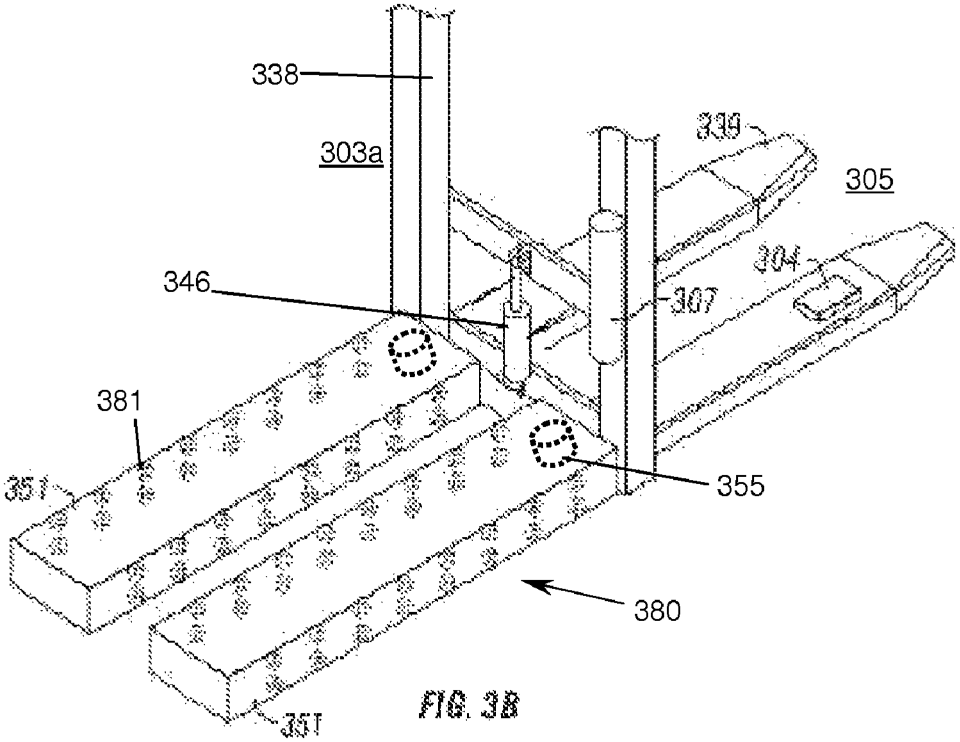
Figure 3C:
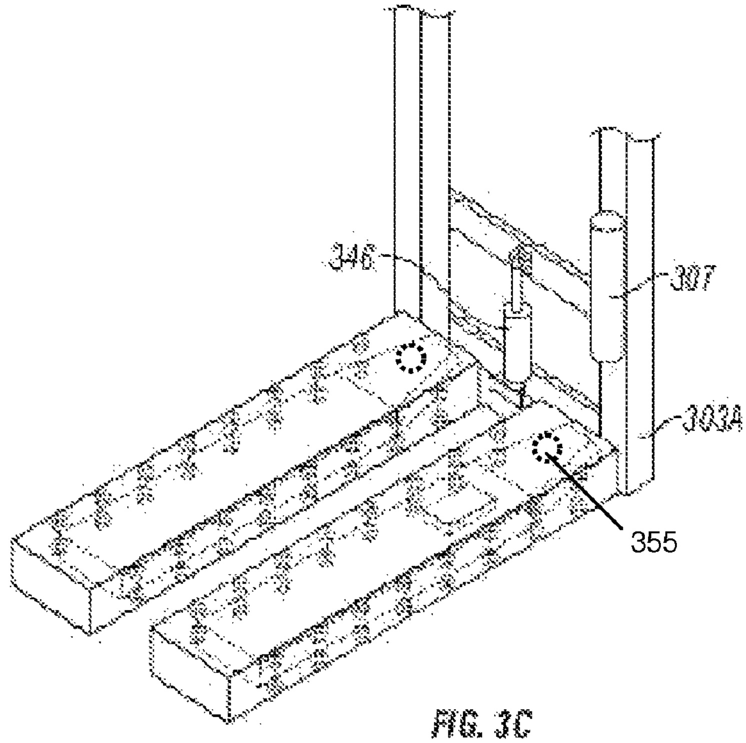
Figure 3G:
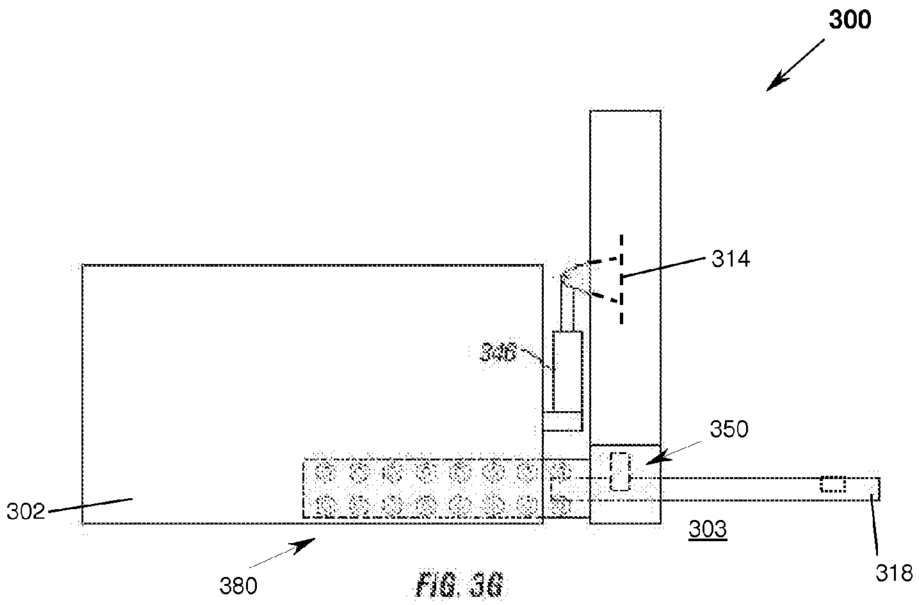
Figure 3H:
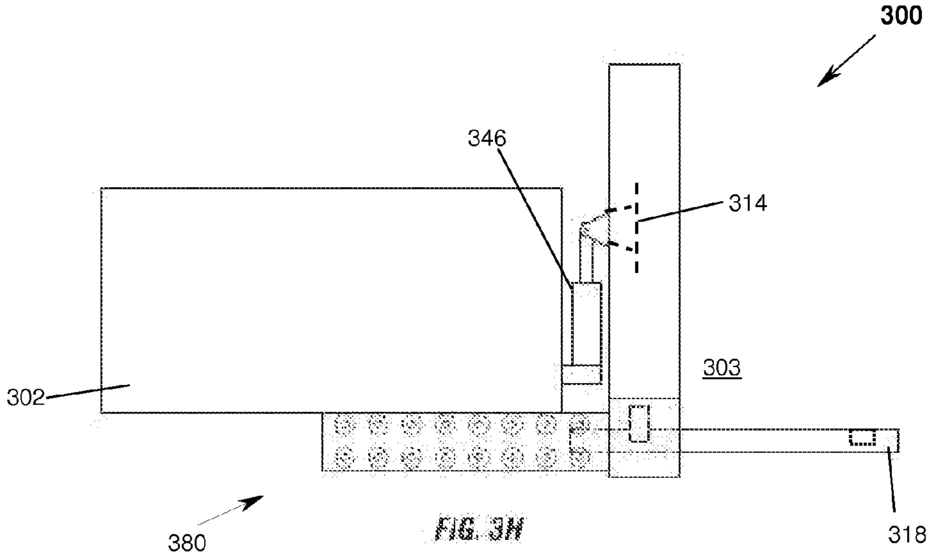

Embodiments of lift truck 300 shown in FIGS. 3A, 3B, and/or 3C may each include a safety system 301 like that of the safety system 201 that was previously described. As such, the safety system 301 may include a controller (not shown) configured to receive signals from sensors 304 and/or 307. If a certain signal is not detected and/or the signal is associated with a 'NOGO' situation (e.g., the lack of a load on lifter element 318), the safety system 301 may configure the lift truck 300 into a safety configuration 308. In one embodiment, the safety system 301 may automatically default the configuration of the lift truck 300 into the safety configuration 308*a*.

As an example of the safety system 301 operation, the presence of the load (not shown) may be detected by load (i.e., weight, etc.) sensor 304, and the sensor 304 may send a signal to the controller, which may communicate with an interlock circuit 320. The interlock circuit 320 of the safety system 301 may be used for automatic lock-out to ensure safe operation of the lift truck 300.

Figure 5A:
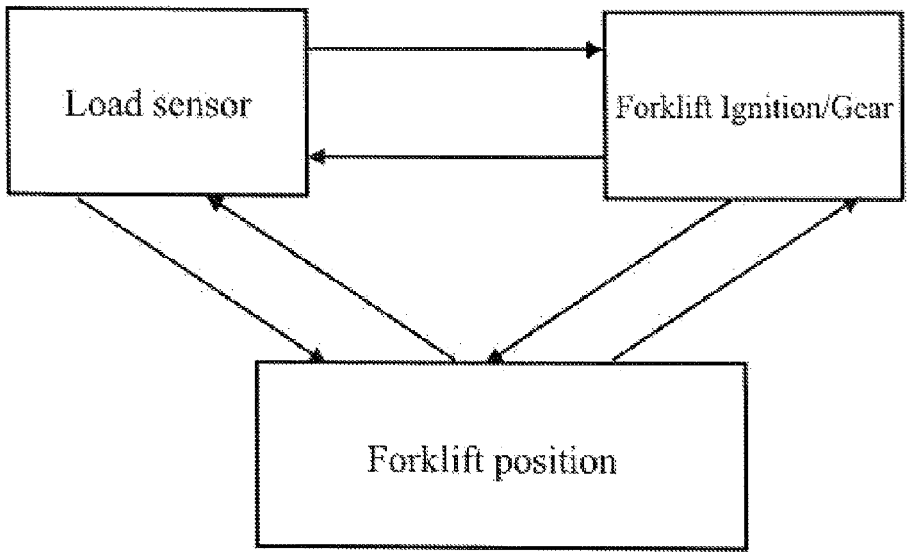
FIGS. 5A and 5B show various functional block diagrams of a safety system, in accordance with embodiments of the present disclosure.
Figure 5B:
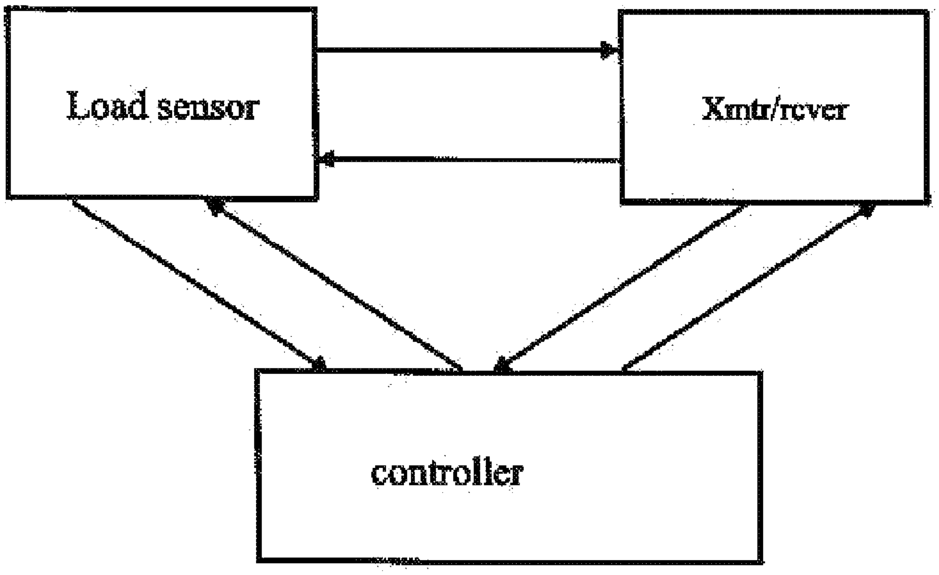

Referring briefly to FIGS. 5A and 5B, these functional block diagrams illustrate the operational relationship between the sensor(s), the controller, the interlock, and the lift truck 300.

The safety system 301 may be used configure the lift truck 300 accordingly. For example, the safety system 301 may affect the configuration of the lift truck 300 ignition & gear system, or the safety system 301 may affect the overall position of the lift truck 300 and/or front-end assembly 303. Hence, whether the load sensor 304 detects the presence of a load (or lack thereof) may have a direct impact on the configuration of the lift truck 300.

Referring again to FIG. 3A, although illustrated as being disposed in (or on) one of the forks 339, the load sensor(s) 304 may be located in other areas of the lift truck 300, such as the mast 303*a*, the vertical member 312, etc. The sensor(s) may be electrically connected to the controller (not shown) and/or the interlock circuit 320. The controller operation may, for example, compare the measured sensor signal with a predetermined and/or programmed threshold value thereby judging whether the presence of the load is detected.

When the sensor(s) 304 sends the applicable signal to the controller, movement and/or operation of the front-end assembly 303 and/or the lift truck 300 may be controlled. This is especially important in places where people are present, spatial constraints exist, and/or damageable goods are in the vicinity. In an exemplary embodiment, the safety system 301 may include the load sensor 304 connected to the front-end assembly 303, such that the load sensor 304 may detect whether the load on one or more of the forks 339 is greater than a predetermined threshold value.

If the load does not exceed the threshold value, the safety system 301 may automatically move the lift truck 300 into a safety configuration 308. If the load exceeds the threshold value, the safety system 301 may maintain the lift truck 300 in a working configuration (205, FIG. 2A). In an embodiment, the threshold value may be one pound, such that when a load of more than one pound is detected, the lift truck 300 may operate in the working configuration 305 without the need to use the override device 310. If one pound or more is not detected, the safety system 301, without actuation of the override 310 and/or if the override 310 is disabled, may automatically default the lift truck 300 to any of the safety configurations as desired.

The safety system 301 may also include the use of other sensors, such as position sensors, which may communicate with the controller and/or control panel to display or indicate whether the front-end assembly 303 is at a proper/desired height, position, configuration, etc. For example, the position sensor may be a tilt sensor 399, which may be mounted upon the cylinder-piston mechanism 346 in order to provide sensor information related to the tilt/position of the front-end assembly 303, the operation of which would be known to one of ordinary skill in the art.

The configuration or position of the lift truck 300 may readily be seen by indicators provided on the control panel (248, FIG. 2B). Additionally, there may be a number of other visual and/or audible indicators, such as blinking lights and buzzers, any of which may be located in the work space or on the control panel.

The provision of an interlock circuit 320 between the front-end assembly 303, the controller, and/or the ignition & gear system is beneficial. If the interlock 320 receives a GO signal that corresponds to the presence of the load, the front-end assembly 303 may be maintained in, and/or automatically move to, the working configuration (205, FIG. 2A).

However, if the controller and/or interlock receive a NOGO signal, which may correspond to a lack of a load (i.e., no load is detected by load sensor 304), the controller and interlock 320 may function to place the lift truck 300 into a safety configuration 308. In one embodiment, the safety system 301 may default the configuration of the lift truck 300 to a safety configuration 308. In a further embodiment, the safety system 301 may default the configuration of the lift truck 300 to the safety configuration 308 until the load is detected and/or until the actuation of an override 310. In order to move to a working configuration 305, the override circuit 310 may require actuation or enabling. This may be accomplished, for example, by the turn of a key, the push of a button, the movement of a lever, etc.

Referring to FIGS. 3A-3H together, which illustrate one embodiment of the safety configuration 308 that includes retraction of the load-bearing members 318 into sleeves 351 that may be disposed within the lift truck 300 or under the lift truck 300. Alternatively, sleeves 351 may not be necessary, and the members 318 may simply be retracted by mechanical and/or hydraulic linkage 380. The linkage 380 and/or sleeve(s) 351 may also include, for example, rollers 381 or other comparable devices (not shown) that engage the members 318 in order to further facilitate the retraction, extension, and/or movement of the member(s) 318. This may also include other forms of power operated lift members 318 with, for example, a particular mechanical linkage and hydraulic cylinder means to effect the extension/retraction of the members 318, such as, for example, a gear assembly (e.g., worm gear (not shown)).

There may be a locking mechanism 350 used to securely fasten the members 318 to the front-end assembly 303 after the members 318 are extended outward. The mechanism 350 may be an electronic locking mechanism that may be configured to raise and lower a fastener 355, such as a pin or a latch. The fastener 355 may be facilitated by an energized spring/coil 352. The locking mechanism 350 may be configured to provide sufficient support between the members 318 and the front-end assembly 303, such that the assembly 303 may lift any sized loads, as may be necessary. Although the clearance or space 353 between the sleeve 351 and the members 318 is not meant to be limited, a tighter clearance may provide for stronger lifting capability.

The sleeves/tubes 351, and thus the load-bearing member 318, may be movable along a horizontal 356, such that the distance (e.g., width) between at least two of the load-bearing members 318 may be adjusted.

A hydraulic ram cylinder-piston mechanism 346 may be mounted between the motorized mover 302 and the front end assembly 303. The cylinder-piston mechanism 346 may be operable in a conventional fashion to raise, lower, and/or otherwise maneuver the front-end assembly 303 in any desired manner. The operation of the cylinder-piston mechanism 346 is not meant to be limited, and mechanism 346 may be configured to place the front-end assembly 303 into other positions and configurations, which may include various "out-of-the-way" positions.

Figure 3J:
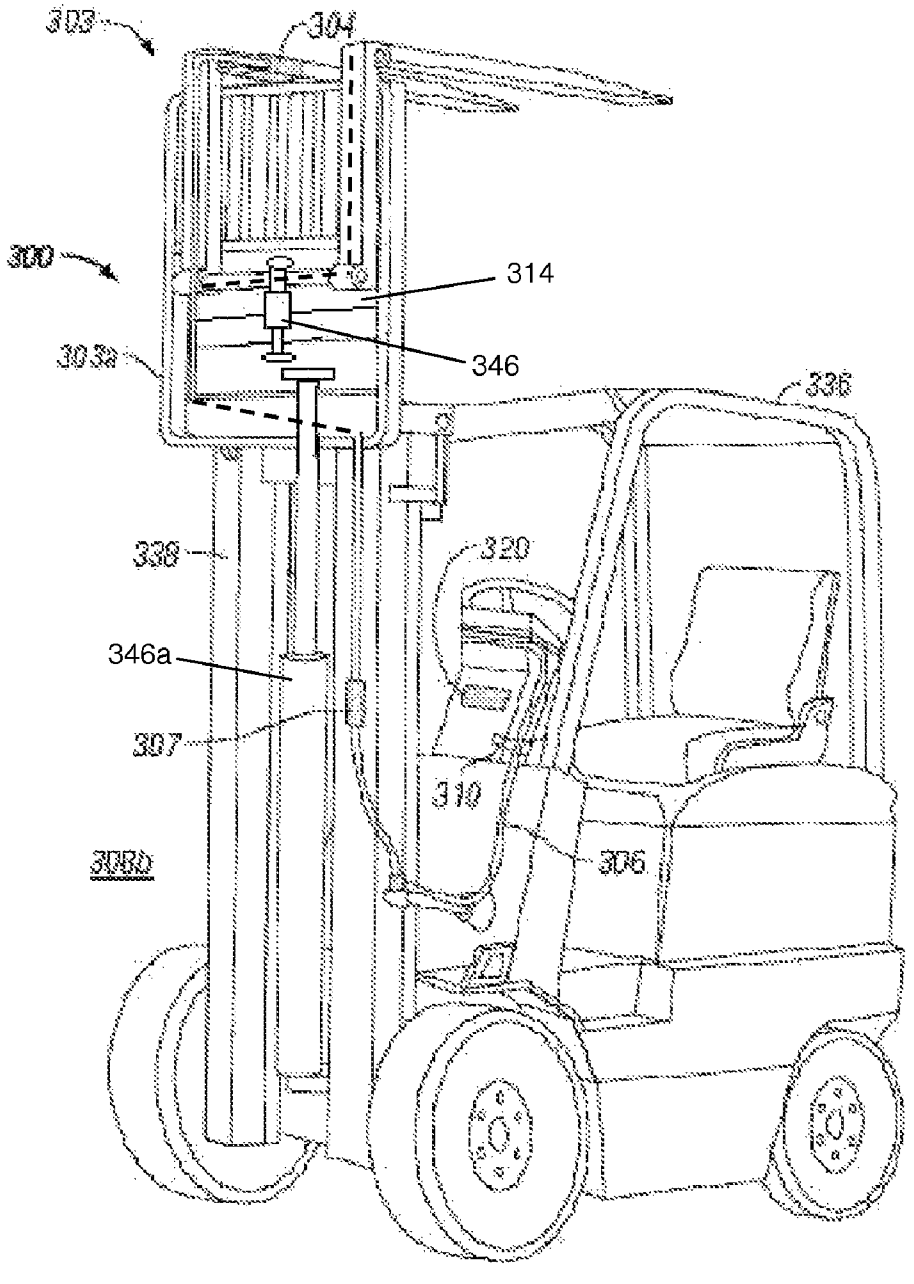

For example, FIG. 3J illustrates the cylinder-piston mechanism 346 may be configured to lift the front-end assembly 303, at least partially, to an elevation greater than the top of the frame 336. The reverse facing direction of the forks 339 may reduce the footprint of the lift truck 300, and may also provide a safety configuration 308*b* that keeps the forks 339 from impacting people and/or other items that may be in the vicinity of the lift truck 300.

Figure 6:
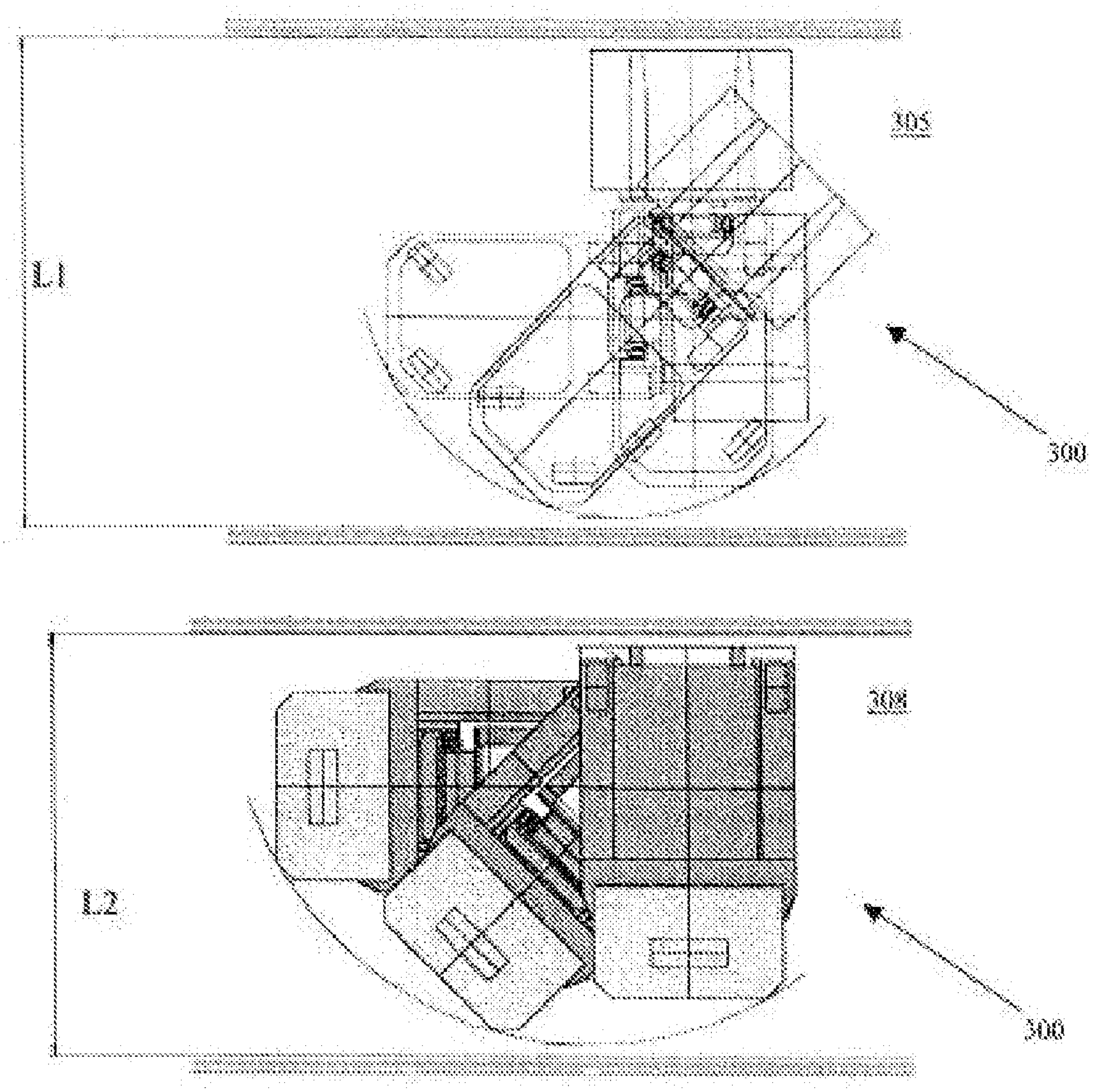
FIG. 6 shows a comparison of a turn radius of a lift truck, in accordance with embodiments of the present disclosure.

Referring briefly to FIG. 6, the lift truck 300 in safety configuration 308 may be compared to lift truck 300 in a working configuration. As illustrated, the working configuration 305 includes a larger footprint, as well as a larger turn radius represented by overall length L1. In contrast, the safety configuration 308, which may include any of the safety configurations described herein, has a smaller footprint, and a smaller turn radius, as represented by the smaller overall length L2.

Figure 3K:
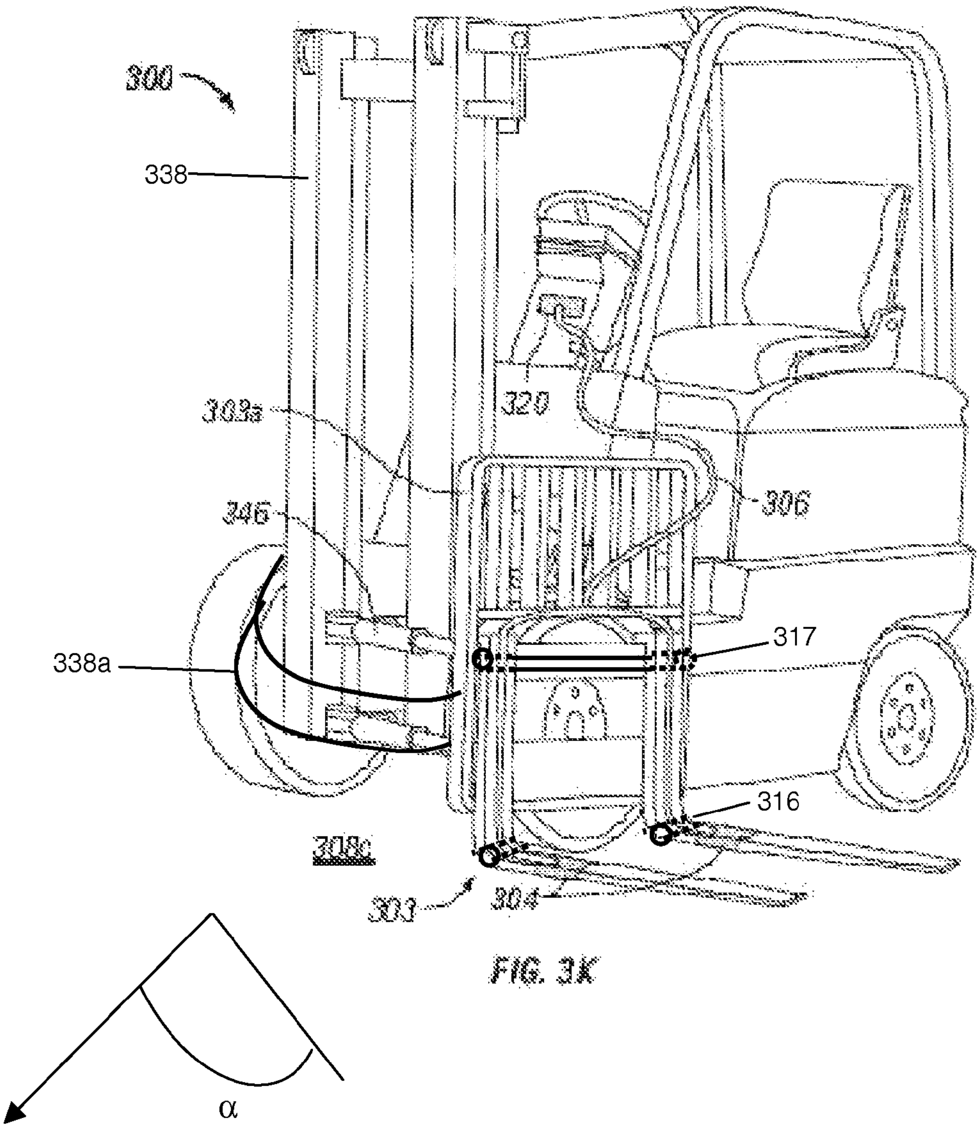

FIG. 3K represents an example of how the cylinder-piston mechanism 346 may be configured to move the front-end assembly 303 rotationally away from a forward position associated with the working configuration 305. For example, the front-end assembly 303 may be rotated at least 25 degrees from the position associated with the working configuration (205, FIG. 2A). Although shown as rotated to the left, the front-end assembly 303 may just as easily be rotated at least 25 degrees to the right. In embodiment, the rotation may be between 75 and 90 degrees to the right and/or left.

To move the front end assembly 303 to the side, the lift truck 300 may be configured with additional rails or guides 338*a* disposed in a horizontal fashion along the front and/or the side of the lift truck 300. As would be apparent to one of skill in the art, the guides or rails 338*a* may enable to the front end 303 to move laterally, horizontally, sideways, rotatively, etc. in a comparable manner as to how verticals guides/rails (138, FIG. 1) facilitate vertical movement. As such, the hydraulic actuator 346 may be configured to move the front end assembly 303 along the rails 338*a*. In an embodiment, there may be more than one hydraulic actuator 346 disposed on the lift truck in order to move and/or rotate the front end assembly 303 from away from the working configuration 305.

Thus, the front end assembly 303 may have features (not shown), such as connectors, etc., operatively and/or movingly engaged with the rails 338*a*. These features may be telescopingly, or otherwise slidingly engaged, and may include, for example, rollers, or any other mechanism or device that may allow the front end assembly 303 to be moved along rails 338*a*. In one embodiment, the front end assembly 303 and the rails 338*a* may be configured to allow the front end assembly 303 and mast 303*a* to rotate at least a portion of the front end assembly 303 at least 75 degrees from a position associated with the working configuration 305.

There may be a conventional power operator (not shown), as known to one of skill in the art, that provides the actuation of the cylinder-piston mechanism 346. The power operator may be powered by electricity, hydraulics, or air pressure to extend and/or retract the piston element (not shown) movably disposed within the mechanism 346. When these components of mechanism 346 extend, move, etc., the operation and/or actuation of the mechanism 346 may cause the front-end assembly 303 to move.

Although a number of configurations are described, the safety configuration 308 may include a number of other arrangements, features, etc., not otherwise mentioned and is not meant to be limited by the description here. The safety configuration 308 may include, for example, the prevention of the motorized mover 302 from starting and/or the prevention of the motorized mover 302 to switch into a drive gear. In one embodiment, the safety configuration 308 may include an inoperable lift truck 300. In another embodiment, the safety configuration 308 may include the front-end assembly 303 moved to a safe position or an 'out-of-the-way' position like that of the embodiments previously described.

The safety system 301 may further comprise a sensor whereby the lift truck 300 will not be capable of shifting out of park and into a moving gear (e.g., drive or reverse) until the forks/blades are placed in a safe position. Thus, any safety configuration of the lift truck 300 may include other arrangements and features not otherwise illustrated or described herein that would be apparent to one of skill in the art.

Figure 4A:
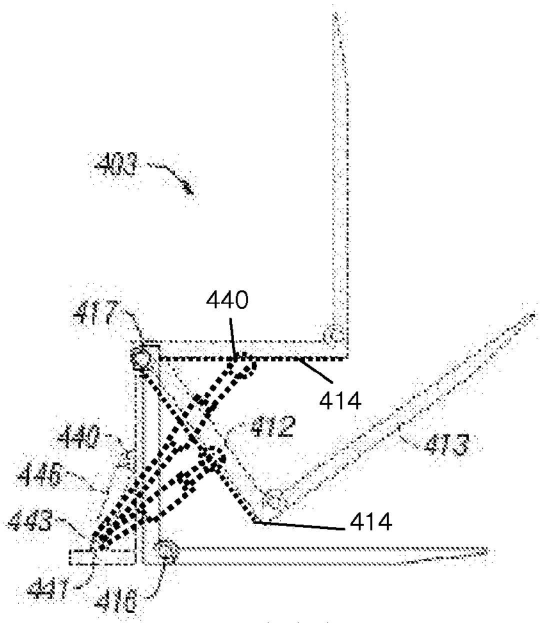
FIGS. 4A, 4B, and 4C show multiple views of a front-end assembly in various positions, in accordance with embodiments of the present disclosure.
Figure 4B:
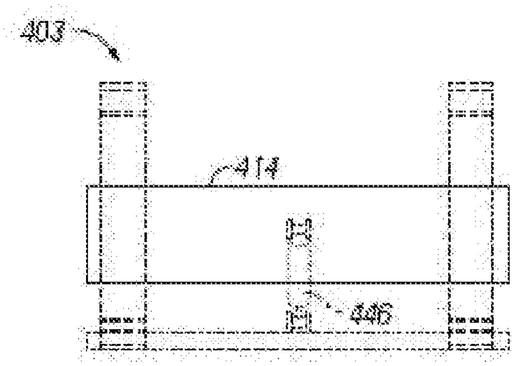
Figure 4C:
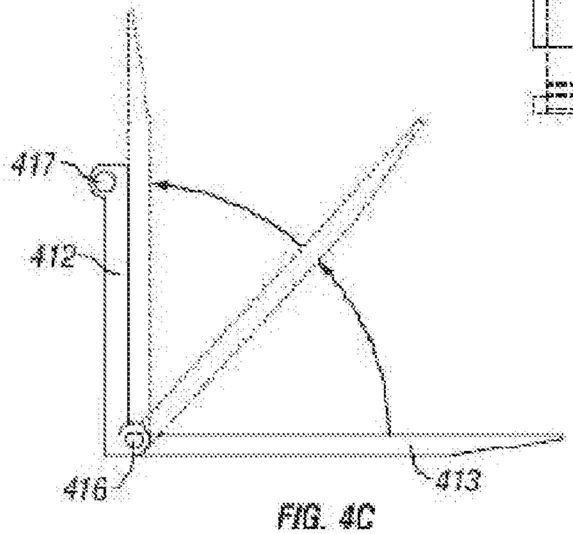

Referring now to FIGS. 4A, 4B, and 4C, multiple views of a front-end assembly 403 in various positions according to embodiments of the present disclosure, are shown. FIGS. 4A, 4B, and 4C together show a close-up view of a front-assembly 403, which may be operatively connected with a lift truck (not shown), as previously described. As shown, lifter element 418 may include least one tine or fork 439. In one embodiment, there may be a plurality of forks 439. The working configuration of the lifter element 418 may include a general L-shape that includes a vertical member 412 and a load-bearing or otherwise horizontal member 413.

In an embodiment, the lifter element 418 may include the vertical member 412 pivotably connected with the load-bearing member 413. Thus, as shown by FIG. 4C, the load-bearing member 413 may pivot with respect to the vertical member 412 around pivot point 416. Additionally, front-end assembly 403 and/or mast (not shown) may pivot with respect to the motorized mover (not shown) about a pivot point 417. The pivoting may be controlled by a cylinder-piston mechanism 446, the operation of which may be comparable to the previously described mechanism 346.

The hydraulically operable cylinder-piston mechanism 446 may be movably attached to the mast 403*a* and/or other portion of the front-end assembly 403 by connector 440. The cylinder-piston mechanism 446 may also be movably connected to a portion of the front-send assembly 403 by connector 441. The connector 441 may be fixedly attached to a horizontal member 414. The connectors 440 and 441 may be any connector known in the art, such as a pivotable bracket assembly. One of the connectors 440 or 441 may be connected to a horizontal member 414.

The cylinder-piston mechanism 446 may be, for example, a two-way cylinder in which a piston disposed within the cylinder may be pushed, or otherwise moved, one way or the other as may be desired in order to increase or decrease the overall length of the cylinder-piston mechanism and corresponding connector rods 443 to their connectors 440, 441.

The safety system may thus include forks or blades that are capable of pivotally folding inward, upwards, or away from each other or into the sides of the lift truck for safe storage during non-load bearing travel. In one embodiment, there may be a set of forks whereby the forks are adjoined by a plate with a piston in order to elevate and/or rotate the forks above the cab and/or operator and away from pedestrians. Another aspect of the system may include the capability of the forks to retract into the body of the lift truck for safe storage.

Embodiments of the disclosure may provide for a method of operating a lift truck. The method may include various steps, such as actuating an override to move the lift truck from a safety configuration into a working configuration, positioning a load onto a front end assembly movably attached to the lift vehicle, and automatically moving the lift truck into the safety configuration once the load is removed from the front end assembly.

In addition, the step of automatically moving to the safety configuration may further include moving the front end assembly to an out-of-the-way position, rendering an engine of the lift truck inoperable, preventing a gear assembly of the lift truck from changing between gears, and combinations thereof.

The out-of-the-way position may include at least one of moving the front end assembly to a height at least partially above the fork lift, retracting at least a portion of the front end assembly underneath the lift truck, rotating at least a portion of the front end assembly at least 75 degrees from a position associated with the working configuration, and combinations thereof.

Embodiments disclosed herein may provide for one or more of the following advantages. Of significant importance, the safety system of the disclosure may prevent injures and the loss of life. The safety system may also prevent the loss of material and property damage. Second, embodiments disclosed herein may provide for a smaller turning radius. The smaller turn radius means that more space may be used to store more material, or that more aisles may be used to provide goods to a consumer. Additionally, the "footprint" of the lift truck may be considerably smaller than current existing models during transit and non-transit (e.g., storage, etc.).

Additional advantages include a safety system that may expeditiously and conveniently be installed on lift trucks and material handlers of any type. The ability to retrofit may be beneficial because there will not be a need to purchase a new lift truck. The safety system may beneficially default the configuration of the lift truck to a safety configuration, whereby the safety feature requires a specific act or event to occur in order to place the lift truck in a working configuration. Without the act or event, the system beneficially prevents the lift truck from going into the working configuration. The safety system of the present disclosure may advantageously be applied to any number of other types of vehicles or movers, and is not limited to lift trucks, forklifts, etc.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A lift truck safety system comprising:

a motorized mover;

a front end assembly movably attached to the motorized mover, wherein the front end assembly is movable between at least one of a safety configuration and a working configuration; and a load sensor operatively connected between the motorized mover and the front end assembly, wherein the load sensor is configured to detect the presence of a load on the front end assembly, wherein the front end assembly automatically moves to the safety configuration when the load is not detected by the load sensor.

2. The lift truck safety system of claim 1, wherein the safety configuration comprises the front end assembly disposed at a height at least partially above a top of the motorized mover.

3. The lift truck safety system of claim 1, wherein the safety configuration comprises at least a portion of the front end assembly retracted into the motorized mover.

4. The for lift truck safety system of claim 1, wherein the safety configuration comprises at least a portion of the front end assembly retracted underneath the motorized mover.

5. The lift truck safety system of claim 1, wherein the safety configuration comprises at least a portion of the front end assembly rotated at least 75 degrees from a position associated with the working configuration.

6. The lift truck safety system of claim 1 further comprising an interlock that maintains the front end assembly in the safety configuration until the load is detected.

7. The lift truck safety system of claim 6 further comprising an override device in operative communication with the front end assembly, wherein activation of the override device allows the front end assembly to move from the safety configuration to the working configuration when the load is not detected.

8. The lift truck safety system of claim 6, wherein the interlock is configured to prevent the motorized mover from moving out of a first gear position.

9. The lift truck safety system of claim 6, wherein the interlock is configured to prevent the motorized mover from starting.

10. The lift truck safety system of claim 1, wherein the front end assembly further comprises:

at least one pivotably movable vertical member; and at least one load-bearing member pivotably connected to the at least one pivotably movable vertical member, wherein the safety configuration further comprises pivotable movement of at least one of the vertical member, the load-bearing member, and combinations thereof, relative to the motorized mover.

11. The lift truck safety system of claim 10, wherein the front end assembly further comprises:

at least one horizontal member fixedly attached to the at least one vertical member; and a piston device configured to move the at least one horizontal member, thereby moving the at least one vertical member.

12. A front end assembly for a motorized mover, the front end assembly comprising:

at least one lifter element movably attached to the motorized mover; and at least one load sensor operatively connected to the at least one lifter element, wherein the front end assembly is configured to move between at least one of a safety configuration and a working configuration in response to a signal detected by the at least one load sensor, wherein the signal pertains to the presence of a load on the at least one lifter element.

13. The front end assembly of claim 12, wherein the safety configuration comprises an inoperable motorized mover, and the working configuration comprises an operable motorized mover.

14. The front end assembly of claim 12, wherein the safety configuration comprises the at least one lifter element in an out-of-the-way position.

15. The front end assembly of claim 14, wherein the front end assembly automatically moves to the out-of-the-way position the load is not detected.

16. The front end assembly of claim 13, the front end assembly further comprising:

at least one pivotably moveable vertical member; and at least one load-bearing member pivotably connected to the at least one pivotably moveable vertical member, wherein the safety configuration further comprises movement of at least one of the vertical member, the load-bearing member, and combinations thereof, relative to the motorized mover.

17. The front end assembly of claim 16 further comprising:

at least one horizontal member fixedly attached to the at least one vertical member; and a piston device operatively connected to the motorized mover, wherein the piston device is configured to move the at least one horizontal member, thereby moving the at least one vertical member.

18. A method of operating a lift truck, the method comprising:

actuating an override to move the lift truck from a safety configuration into a working configuration;

positioning a load onto a front end assembly movably attached to the lift truck; and automatically moving the lift truck into the safety configuration once the load is removed from the front end assembly.

19. The method of claim 18, wherein the automatically moving to the safety configuration comprises moving the front end assembly moved to an out-of-the-way position, rendering an engine of the lift truck inoperable, preventing a gear assembly of the lift truck from changing between gears, and combinations thereof.

20. The method of claim 19, wherein the out-of-the-way position comprises at least one of moving the front end assembly to a height at least partially above the lift truck, retracting at least a portion of the front end assembly underneath the lift truck, rotating at least a portion of the front end assembly at least 75 degrees from a position associated with the working configuration, and combinations thereof.

* * * * *